United States Patent
Tada et al.

(10) Patent No.: US 6,650,497 B1
(45) Date of Patent: Nov. 18, 2003

(54) RECORDING AND/OR REPRODUCING APPARATUS AND METHOD FOR LOADING A HEAD ON A DISC-SHAPED RECORDING MEDIUM

(75) Inventors: Kiyoshi Tada, Kanagawa (JP); Ryuji Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/566,413

(22) Filed: May 8, 2000

(30) Foreign Application Priority Data

May 31, 1999  (JP) .......................................... 11-152930

(51) Int. Cl.$^7$ ............................................. G11B 21/02
(52) U.S. Cl. ...................................................... 360/75
(58) Field of Search ............................. 360/75, 78.08, 360/78.09, 78.12, 254.8, 48; 318/280; 451/37

(56) References Cited

U.S. PATENT DOCUMENTS

| | | | | |
|---|---|---|---|---|
| 4,786,995 A | * | 11/1988 | Stupeck et al. | 360/75 |
| 4,816,942 A | * | 3/1989 | Tanishima et al. | 360/78.12 |
| 5,341,260 A | * | 8/1994 | Jabbari | 360/254.8 |
| 5,384,675 A | * | 1/1995 | Crawforth et al. | 360/75 |
| 5,446,606 A | * | 8/1995 | Brunner et al. | 360/75 |
| 5,729,399 A | * | 3/1998 | Albrecht et al. | 360/75 |
| 5,820,446 A | * | 10/1998 | Lu | 451/37 |
| 5,991,114 A | * | 11/1999 | Huang et al. | 360/75 |
| 6,140,784 A | * | 10/2000 | Mazda | 318/280 |
| 6,239,935 B1 | * | 5/2001 | Shrinkle | 360/75 |
| 6,278,570 B1 | * | 8/2001 | Kanamaru et al. | 360/75 |
| 6,504,663 B2 | * | 1/2003 | Hirano et al. | 360/48 |

* cited by examiner

*Primary Examiner*—David Hudspeth
*Assistant Examiner*—Fred F. Tzeng
(74) *Attorney, Agent, or Firm*—Frommer Lawrence & Haug LLP; William S. Frommer; Leonard J. Santisi

(57) ABSTRACT

A recording and/or reproducing apparatus and method for loading a head on a disc-shaped recording medium including a head to write data on and/or read data from the disc-shaped recording medium, a head supporting member for moving the head, and a moving member for moving the head supporting member to move the head in the radial direction of the disc-shaped recording medium. In addition, a head landing member is provided for landing the head onto the disc-shaped recording medium via the head supporting member. Further, a controlling member controls the head landing member and the moving member so that the head landing member lands the head onto the disc-shaped recording medium while the head is moved by the head moving member in the radial direction of the disc-shaped recording medium.

27 Claims, 19 Drawing Sheets

FIG.3A FIG.3B

RECORDING AND/OR REPRODUCING APPARATUS AND METHOD FOR LOADING A HEAD ON A DISC-SHAPED RECORDING MEDIUM

BACKGROUND OF THE INVENTION

1. Field of the Invention

The present invention relates to a recording and/or reproducing apparatus to write and/or read an information signal to and/or from a large-capacity floppy disc.

2. Related Art

As a removable disc-like recording medium, a floppy disc has been proposed having a capacity significantly larger than existing floppy discs, for example, several tens megabytes to several hundreds megabytes. The large-capacity floppy discs have been developed as an integration of various technologies concerning materials of the recording medium, structure of the head chip, processing of read signal, existence of tracking servo, etc. Also, as a disc drive for such a large-capacity floppy disc (referred to herein as "large-capacity floppy disc drive"), a head-flying type recording and/or reproducing apparatus has been proposed in which with the floppy disc being rotated at a high speed, data is written to or read from the floppy disc by a magnetic head flying from the signal recording surface of the floppy disc.

As briefly described above, the head-levitated type large-capacity floppy disc drive is adapted such that a floppy disc is rotated at a high speed to create an air flow pressure, namely, an air film, which is used to levitate the magnetic head. Magnetic head levitation has already been achieved in the field of hard disc drives. In a hard disc drive, the magnetic disc is housed in a disc cartridge and a sliding plate is levitated in which a head chip is incorporated.

In the head-flying type large-capacity floppy disc drive, a lifting mechanism is used to move the magnetic head up and down between disc cartridge unloading and loading positions.

In the large-capacity floppy disc drive, however, since the magnetic head lifting mechanism is driven at a constant speed by a DC motor, the magnetic head causes a large impact to be applied to the floppy disc which is unavoidable for mechanical reasons and consequently causes damage to the disc surface, when touching the surface of the floppy disc.

OBJECTS OF THE INVENTION

It is therefore an object of the present invention to provide a recording and/or reproducing apparatus which avoids the aforementioned deficiencies of the prior art.

It is also an object of the present invention to provide a head-levitated type large-capacity floppy disc drive for a recording and/or reproducing apparatus wherein the magnetic head does not cause a large impact to be applied to the floppy disc.

Accordingly, the present invention has an object to overcome the above-mentioned drawbacks of the prior art by providing a recording and/or reproducing apparatus in which the head chip on the sliding plate can gently touch the recording medium so as to be prevent the floppy disc from being damaged.

Various other objects, advantages and features of the present invention will become readily apparent from the ensuing detailed description and the novel features will be particularly pointed out in the appended claims.

SUMMARY OF THE INVENTION

The above objects can be attained by providing a recording and/or reproducing apparatus adapted to write an information signal to and/or read an information signal from a disc-like recording medium by a magnetic head being levitated ("flying") by an air flow created by the rotating disc-like recording medium, the apparatus includes a magnetic head to write and/or read the information signal to and/or from the disc-like recording medium; means for supporting the magnetic head; means for linearly moving the magnetic head radially of the disc-like recording medium via a magnetic head supporting member; means for landing the magnetic head onto the disc-like recording medium via the magnetic head supporting member; and controlling means for landing, when the disc-like recording medium is loaded, the magnetic head via the magnetic head landing means while moving the magnetic head radially of the disc-like recording medium via the magnetic head moving means.

Thus, when the disc-like recording medium is loaded, the magnetic head will not always land at the same position. Namely, each time a disc-like recording medium is loaded, the magnetic head lands at a different position. Also, the magnetic head can thereby land softly.

Furthermore, a magnetic head landing driving means included in the magnetic head landing means is controlled to vary the landing speed for the magnetic head landing means to land the magnetic head slowly onto the disc-like recording medium. Thus, the soft landing of the magnetic head can be further assisted.

BRIEF DESCRIPTION OF THE DRAWINGS

The following detailed description given by way of example, but not intended to limit the invention solely to the specific embodiments described, may best be understood in conjunction with the accompanying drawings in which:

FIGS. 3A, 3B and 3C are plan views of the magnetic head element of the magnetic head included in the floppy disc drive of FIG. 1.

DETAILED DESCRIPTION OF CERTAIN PREFERRED EMBODIMENTS

Figure 1:
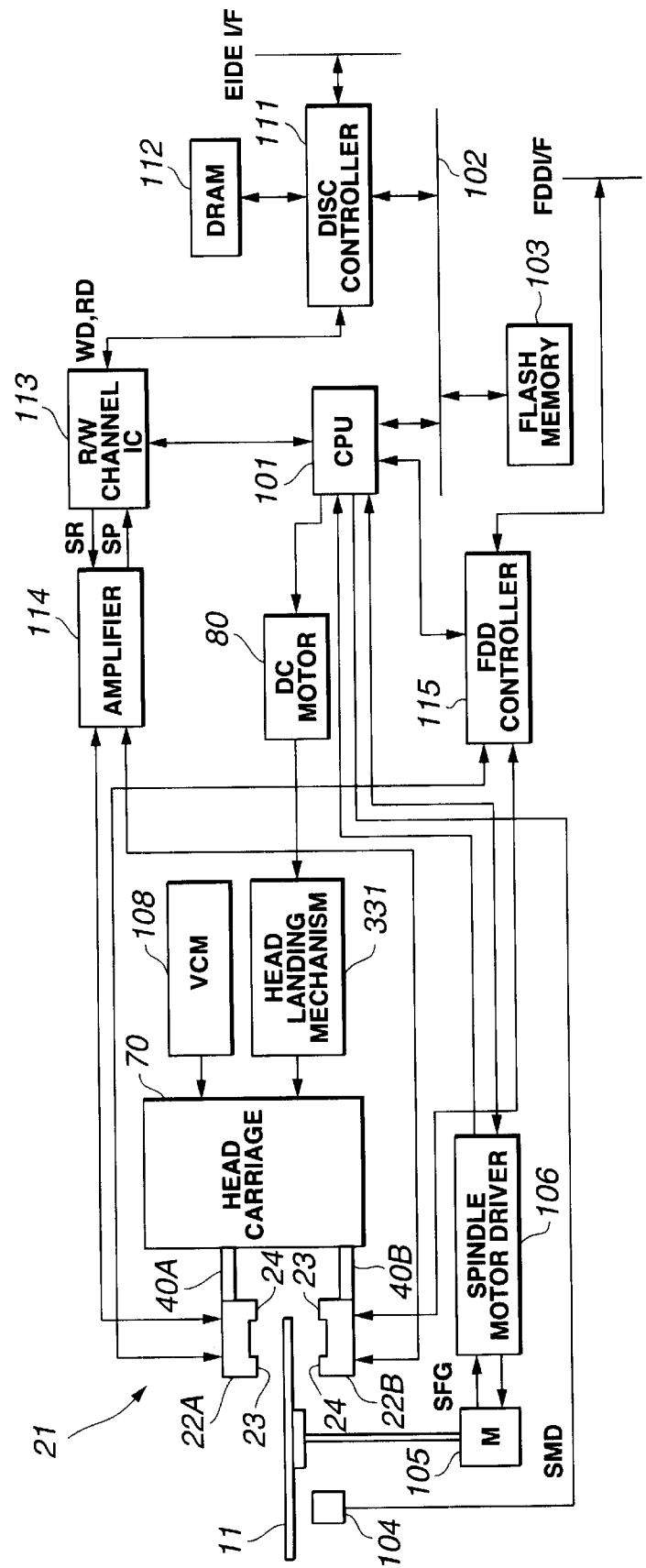
FIG. 1 is a block diagram of the operation of a preferred embodiment of a floppy disc drive in accordance with the teachings of the present invention.

The recording and/or reproducing apparatus according to the present invention will be further described below with reference to certain preferred embodiments thereof shown in the accompanying drawings. A floppy disc drive in accordance with a preferred embodiment of the present invention is generally indicated by reference numeral 10 in FIG. 1.

As shown in FIG. 1, the floppy disc drive 10 includes a magnetic head 21 in which an upper head 22A with a head chip for a standard-capacity floppy disc and a lower head 22B with a head chip for a large-capacity floppy disc, are disposed on opposite sides, respectively, of a floppy disc 11. The standard- and large-capacity floppy discs will further be described later.

In the floppy disc drive 10, when a large-capacity floppy disc cartridge HFDC is loaded and the magnetic head 21 lands towards a large-capacity floppy disc 11A, a head moving means and magnetic head landing means, which will further be described later, are controlled by a CPU 101. Under the control of the CPU 101, the upper and lower heads 22A and 22B will gently touch the surfaces of the floppy disc. Thus, the floppy disc surface will not be damaged.

In particular, the lower head 22B is lifted up to the floppy disc 11. However, the "lifted up" will be referred to as "landed" for the convenience of description. The landing operation will further be described later.

Figure 2A:
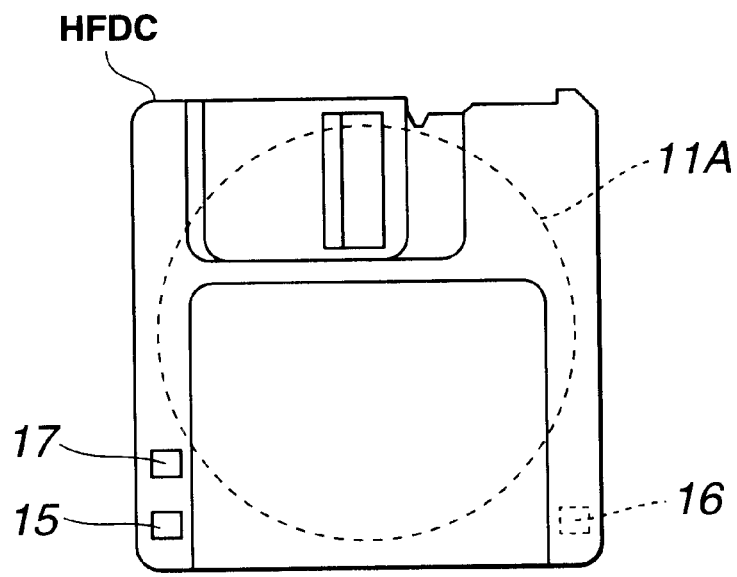
FIG. 2 shows two types of floppy discs compatible with the floppy disc drive of FIG. 1.
Figure 2B:
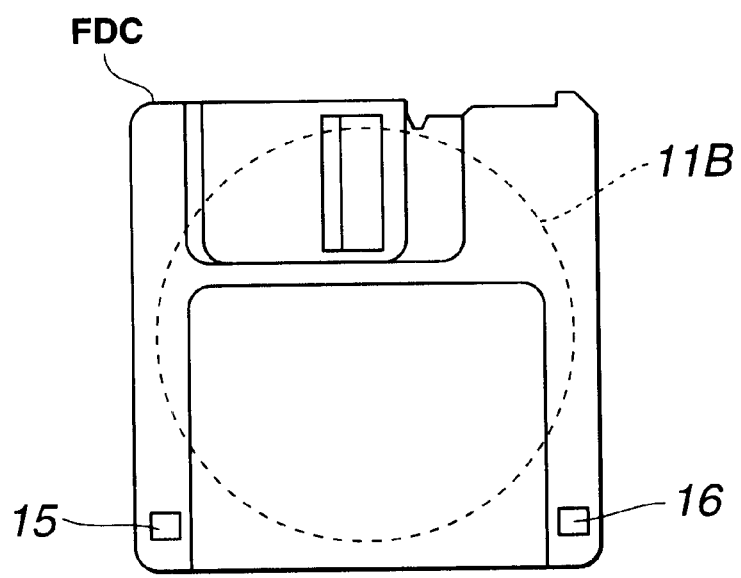

The floppy disc 11 usable in the floppy disc drive 10 is assumed herein to be a large-capacity floppy disc 11A accommodated in the large-capacity floppy disc cartridge HFDC shown in FIG. 2A, and a standard-capacity floppy disc 11B accommodated in a standard-capacity floppy disc cartridge FDC shown in FIG. 2B. FIG. 2A shows the large-capacity floppy disc cartridge HFDC having accommodated therein the floppy disc 11A which is exchangeable with any existing floppy disc having a recording capacity of several tens megabytes to several hundreds megabytes, for example, or a high recording-density (upper-mode) floppy disc having a larger recording capacity. FIG. 2B shows the standard-capacity floppy disc cartridge FDC having accommodated therein the standard-capacity floppy disc 11BA which is a standard recording-density (lower-mode) floppy disc having a recording capacity of two megabytes, for example.

As shown in FIGS. 2A and 2B, each of the floppy disc cartridges has a write protector 15 and an HD hole 16. The cartridge has provided therein a through-hole along with the write protector 15. When the through-hole is open, that is, when the through-hole is not closed by the write protector 15, data write to the floppy disc is permitted. On the other hand, when the through-hole is not open, namely, when the through-hole is closed by the write protector 15, data write to the floppy disc is not permitted. When the HD hole 16 is open, the floppy disc accommodated in the cartridge is a disc having a recording capacity of about 2 megabytes (when the floppy disc is unformatted), namely, a so-called 2HD floppy disc. When the HD hole 16 is closed, the floppy disc accommodated in the cartridge is any floppy disc other than the 2HD floppy disc. Also as shown in FIG. 2A, the floppy disc cartridge has formed herein a third identifying hole 17 in a location other than the write protector 15 or the HD hole 16. This hole 17 is provided in the large-capacity floppy disc cartridge HFDC, indicating that a large-capacity floppy disc 11 A of several tens to hundreds megabytes in capacity is accommodated therein.

The construction and operation of the floppy disc drive 10 will be described hereinbelow with reference to FIG. 1.

The floppy disc drive 10 includes a spindle motor 105 to spin the floppy disc 11, either the large-capacity floppy disc 11A or standard-capacity floppy disc 11B, and a spindle motor driver 106 to drive the spindle motor 105. The spindle motor 105 provides a frequency signal SFG corresponding to its speed and this frequency signal SFG is supplied to the CPU 101 through the spindle motor driver 106. Referring to the frequency signal SFG, the CPU 101 controls the spindle motor driver 106 to rotate the floppy disc 11 at a predetermined speed.

The floppy disc drive 10 further includes a voice coil motor (VCM) 108 which is a head moving mechanism for linearly moving a head carriage 70 radially of the disc. The head carriage 70 has support arms 40A and 40B for supporting an upper head 22A and lower head 22B, respectively, forming together a magnetic head 21.

When the large-capacity floppy disc 11A is loaded, an R/W channel IC 113 which will further be described later provides tracking information for the magnetic head and gray code read information, etc. to the CPU 101 which in turn controls, based on the tracking information, gray code read information, etc., the VCM 108 to correctly position the magnetic head 21 on a target track on the floppy disc 11.

Further, the floppy disc drive 10 includes a magnetic head landing mechanism for landing the upper head 22A and the lower head 22B of the magnetic head 21 onto the floppy disc 11 by means of the support arms 40A and 40B and the head carriage 70. The magnetic head landing mechanism includes a head lowering mechanism 331 and a DC motor 80 to drive the magnetic head landing mechanism 331. The DC motor 80 is controlled by the CPU 101 in a pulse width modulation (PWM) manner to move the head lowering mechanism 331 at a speed thus changed under the PWM control.

When the large-capacity floppy disc cartridge HFDC is inserted into the disc slot of the floppy disc drive 10, the CPU 101 will interlock the VCM 108 with the magnetic head landing mechanism and control the lifting of the support arms 40A and 40B via the head carriage 70. More specifically, while the head carriage 70 is being moved by the VCM 108 radially of the floppy disc 11A, the DC motor 80 is driven at a changed speed to move the head lowering mechanism 331 which thus land the upper and lower heads 22A and 22B slowly onto the floppy disc 11A.

Therefore, in the floppy disc drive 10 provided with this magnetic head 21, while the heads 22A and 22B are being moved radially of the floppy disc 11A, the magnetic head 21 is landed onto the large-capacity floppy disc 11A at a relatively slow speed which will not break the air film. Therefore, the magnetic head 21 can gently touch the large-capacity floppy disc 11A which will accordingly not be damaged.

On the other hand, when the standard-capacity floppy disc cartridge FDC is inserted into the disc slot, the CPU 101 controls the DC motor 80 of the magnetic head landing mechanism in the PWM manner to land the heads 22A and 22B slowly onto an outer circumferential area, for example, of the magnetic disc 11B by means of the head carriage 70 and head supports 40A and 40B.

Further, the floppy disc drive 10 includes a high-density (upper mode) writing and/or reading system and a standard-density (lower mode) write and/or read system. The high-density (upper mode) write and/or read system incorporates a disc controller 111 to send and receive data, operating status and command to and from a host computer via a EIDE interface, DRAM 112 as a data buffer, an R/W channel IC 113 to process write and read signals, and an amplifier 114. The amplifier 114 includes a write amplifier to amplify a write signal supplied from the R/W channel IC 113 and to supply the amplified write signal to a high-density (upper mode) write head chip 24 of the upper and lower heads 22A and 22B and a read amplifier to amplify a read signal read by the head chip 24 and to supply the amplified read signal to the R/W channel IC 113.

The disc controller 111 is connected to an internal bus 102. The operation of the disc controller 111 and that of the R/W channel IC 113 are controlled by the CPU 101, respectively.

The floppy disc drive 10 further includes an FDD controller 115 for the standard-density (lower mode) write and read system. The FDD controller 115 is connected to the host computer via a FDD interface. The FDD controller 115 generates, when in the write mode, a write signal from a MFM modulated data supplied from the host computer and provides the write signal it to the standard-density (lower mode) head chip 23 of the upper and lower heads 22A and 22B. The FDD controller also acquires, when in the read mode, an MFM modulated signal from the read signal from the head chip 23 to the host computer, and other functions.

The operations of the floppy disc drive 10 after the upper and lower heads 22A and 22B are landed onto the floppy disc 11 under the control of the CPU 101, will be described hereinbelow.

The large-capacity floppy disc 11A has servo information already written therein. While reading the servo information, the CPU 101 will drive the VCM 108 to move the magnetic head 21.

For the standard-capacity floppy disc 11B, an optical position detecting member using a slit, for example, is provided. For write and/or read of data to and/or from the floppy disc 11B, a detected amount of light is fed back to drive the VCM 108 to move the magnetic head 21.

In the magnetic head 21, the upper and lower heads 22A and 22B are disposed opposite to each other so that the floppy disc 11 is positioned therebetween. The upper head 22A writes and/or reads data to and/or from a recording surface on the upper side of the floppy disc 11, while the lower head 22B writes and/or reads data to and/or from a recording surface on the lower side of the floppy disc 11. As aforementioned, each of the upper and lower heads 22A and 22B incorporates the standard-density (lower-mode) head chip 23 for the standard-capacity floppy disc 11B, and the high-density (upper-mode) head chip 24 for the high-capacity floppy disc 11A.

Figure 3C:
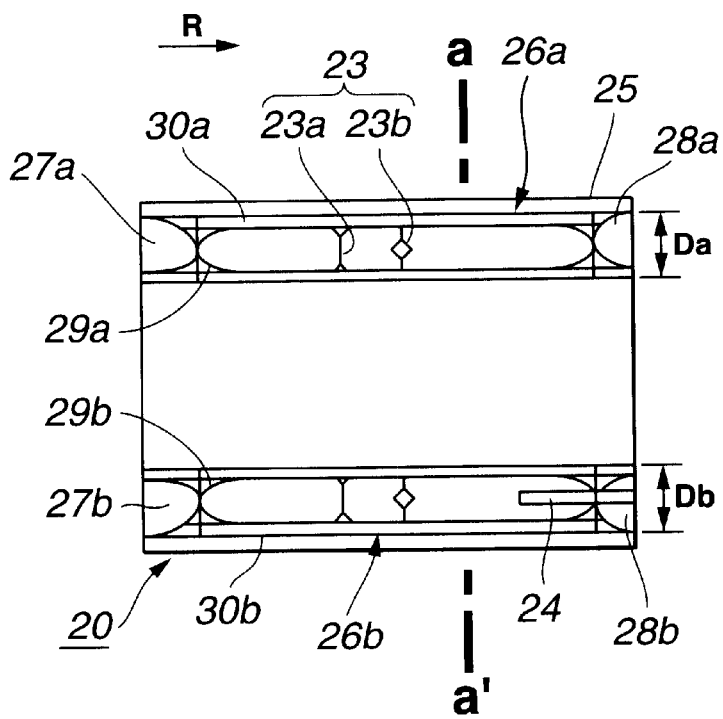
Figure 3C:
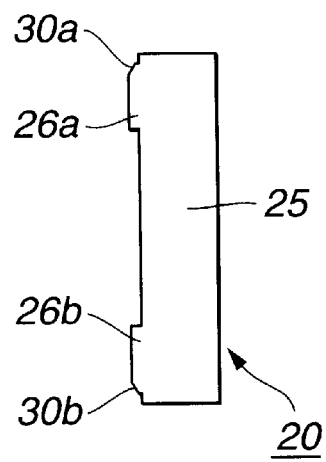
Figure 3C:
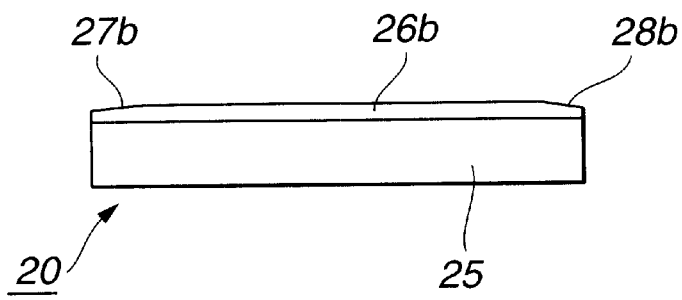

Referring now to FIGS. 3A to 3C, a magnetic head element 20 is illustrated forming each of the upper and lower heads 22A and 22B. FIG. 3A is a bottom view of the magnetic head element 20 of the floppy disc 11, FIG. 3B is a sectional view, taken along the line a—a in FIG. 3A, of the magnetic head element 30, and FIG. 3C is a side elevational view of the magnetic head element 20.

As shown, the magnetic head element 20 includes a slider 25 having formed on the bottom face thereof two rails 26a and 26b extending in the same direction as the track-tangential direction R (rotating direction of the disc) which are in parallel relation to each other. Each of the rails 26a and 26b has a front side and rear side thereof defined with reference to the track-tangential direction R. At the front sides of the rails 26a and 26b, front taper sections 27a and 27b, respectively, are formed and at the rear sides, rear taper sections 28a and 28b, respectively, are formed. The front taper sections 27a and 27b form an angle of approximately 1 deg., for example, relative to the disc recording surface and the rear taper sections 28a and 28b form an angle of 10 deg., for example, relative to the disc recording surface.

The rail 26b is formed having a width Db smaller than a width Da of the rail 26a. The rails 26a and 26b have inner edges 29a and 29b, respectively, which are blended, and outer edges 30a and 30b, respectively, which are tapered. The outer edges 30a and 30b form an angle of approximately 10 deg., for example, relative to the disc recording surface. Edges of the rails 26a and 26b, respectively, other than the inner edges 29a and 29b are blended so as not to damage the disc recording surface.

The standard-density (lower-mode) head chip 23 is assembled in the rail 26a. In the lower mode, the standard-capacity floppy disc 11B is rotated at a standard speed, that is, approximately 300 rpm, for example. When the floppy disc 11B is rotated at this speed, the slider 25 will not fly, so that the head chip 23 is put in contact with the disc recording surface to write and/or read data to and/or from the floppy disc. Thus, the head chip 23 has a write and/or read head 23a and an erase head 23b thereof disposed nearly in the center thereof in the track-tangential direction R where the contact of the head chip 23 with the disc recording surface is most stable.

The high-density (high-mode) head chip 24 is assembled in the rail 26b at the rear side in the track-tangential direction R. The head chip 24 is designed to attain a high linear recording density, for example, a MIG (metal in gap) head structure. When in the upper mode, the large-capacity floppy disc 11A is rotated at a speed as high as approximately 3,600 rpm, for example. When the floppy disc 11A is rotated at this high speed, air flow creates a levitation pressure under which the sliders 25 fly.

Figure 4:
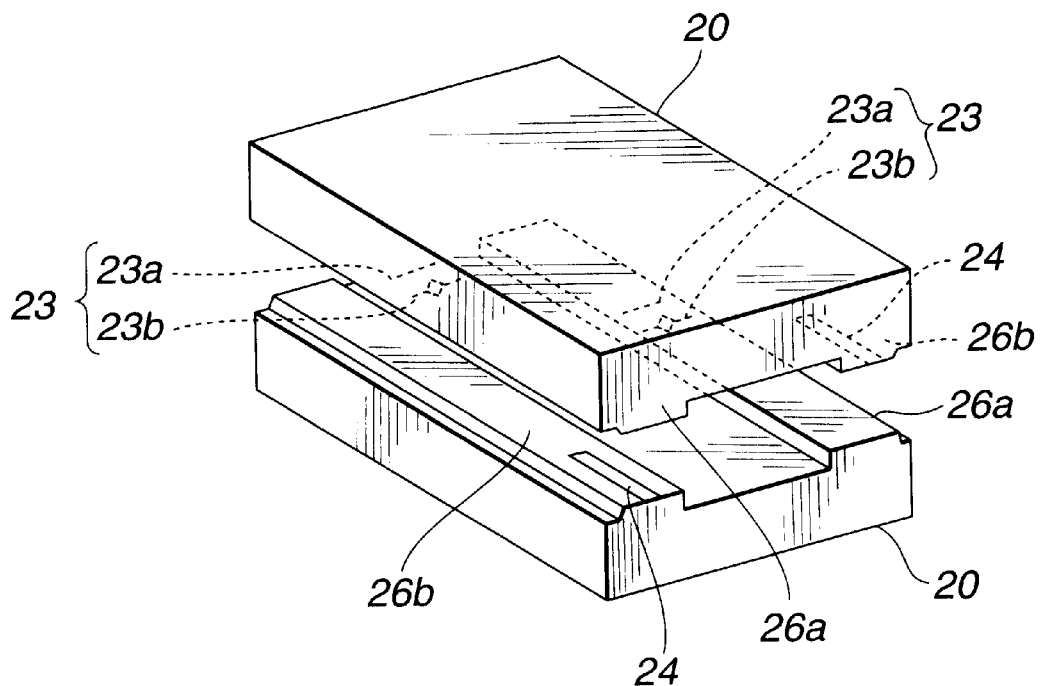
FIG. 4 shows the relative disposition of the magnetic head element forming the upper head and the magnetic head element forming the lower head of the magnetic head included in the floppy disc drive in FIG. 1.

FIG. 4 shows the rails 26a and 26b of the magnetic head element 20 forming the upper head 22A disposed vis-a-vis to the rails 26b and 26a of the magnetic head element 20 forming the lower head 22B. Note that the front tapers 27a and 26b and rear tapers 28a and 28b are not shown in FIG. 4.

Figure 5:
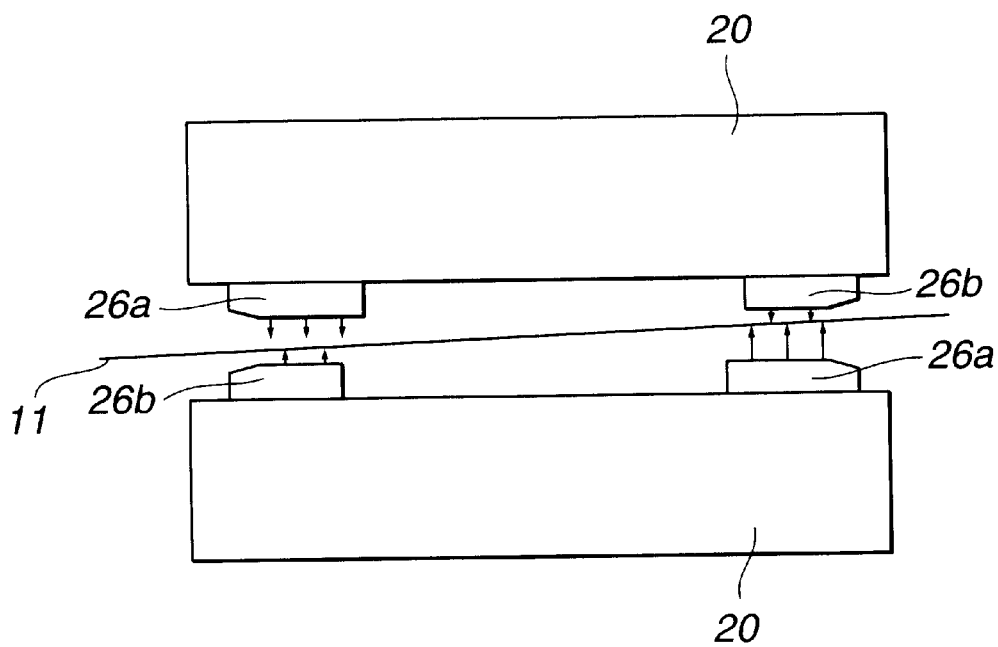
FIG. 5 shows the magnetic head flying from the floppy disc upon rotation of the floppy disc.

While the large-capacity floppy disc 11A is being rotated at the high speed and the slider 25 is being levitated, data is written to and/or read from the floppy disc 11A. For this purpose, the flying of the slider 25 is adjusted for the distance between the disc recording surface and the gap in the head chip 24 to a predetermined value (50 nm, for example). Assuming that the relative peripheral velocity of the large-capacity floppy disc 11A is constant, the levitation depends upon the width of the rails 26a and 26b, and others. To limit the flying of the rail 26b to the distance between the disc surface and the gap in the head chip 24 to be a predetermined value, the width Db of the rail 26b is made smaller than the width Da of the rail 26a as mentioned above. Therefore, while the sliders 25 are being levitated, the magnetic head element 20 is inclined for the rail 26b to be nearer to the disc recording surface than the rail 26a as shown in FIG. 5.

Figure 6:
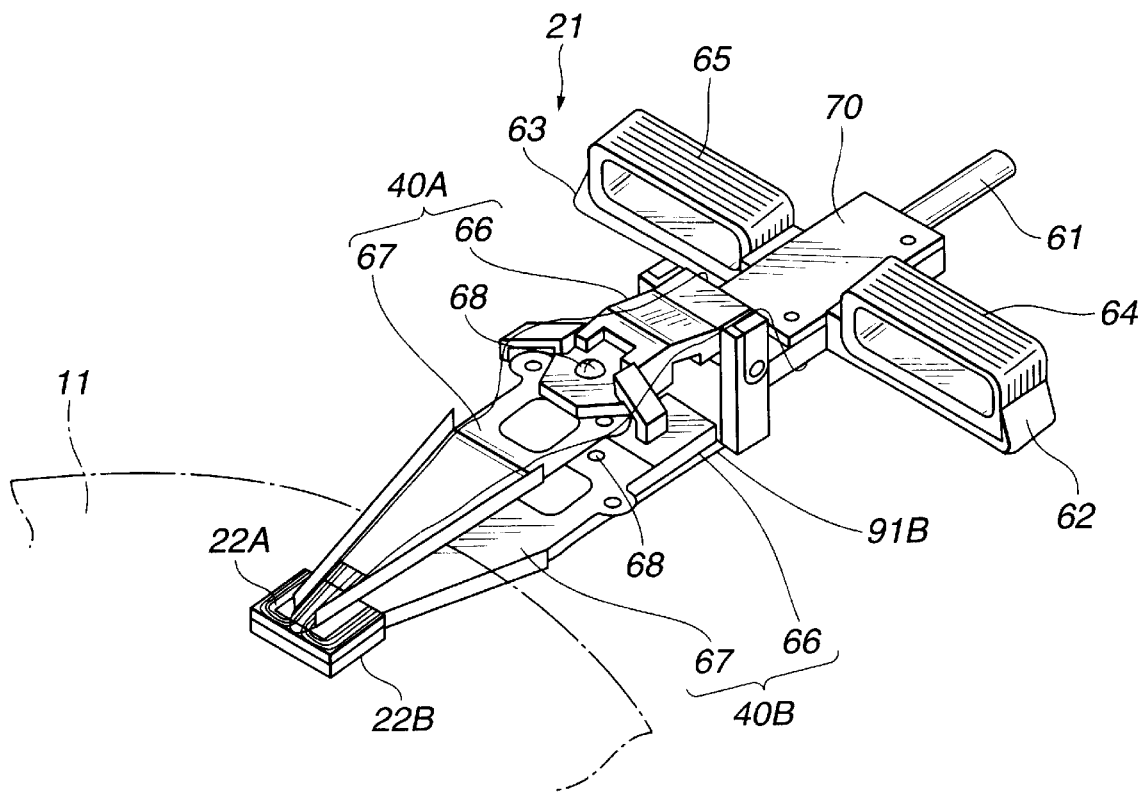
FIG. 6 is a front perspective view of the magnetic head in FIG. 3.

Next, the magnetic head 21 including the upper and lower heads 22A and 22B will further be described below with reference to FIG. 6. In the magnetic head 21, the heads 22A and 22B are supported by the support arms 40A and 40B, respectively as shown. The support arms 40A and 40B are connected to the head carriage 70 which is movable radially of the floppy disc 11.

The head carriage 70 is formed from a synthetic material, such as a synthetic resin, aluminum or magnesium alloy. The head carriage 70 is supported on a main guide shaft 61 and a sub-guide shaft disposed in parallel to the radius of the floppy disc 11. On either side of the base portion of the head carriage 70, a pair of coil support pieces 62 and 63 are provided on which a pair of drive coils 64 and 65 inserted in yokes of the VCM 108 in FIG. 1 are installed. The head carriage 70 is moved radially of the floppy disc 11 when the drive coils 64 and 65 are supplied with a drive current from the VCM 108.

Each of the support arms 40A and 40B connected to the head carriage 70 include a connecting plate 66 for connection to the head carriage 70 and a head supporting spring 67 fixed to the other end of the connecting plate 66. The head supporting spring 67 is formed from a leaf spring to have a generally triangular shape tapered towards the end thereof. The head supporting spring 67 supports the heads 22A and 22B fixed at the end thereof. The supporting spring 67 is fixed at the base end thereof with screws 68 to the end of the connecting plate 66. Thus, the support arms 40A and 40B are landed or lowered by the head lowering mechanism 331.

Figure 7:
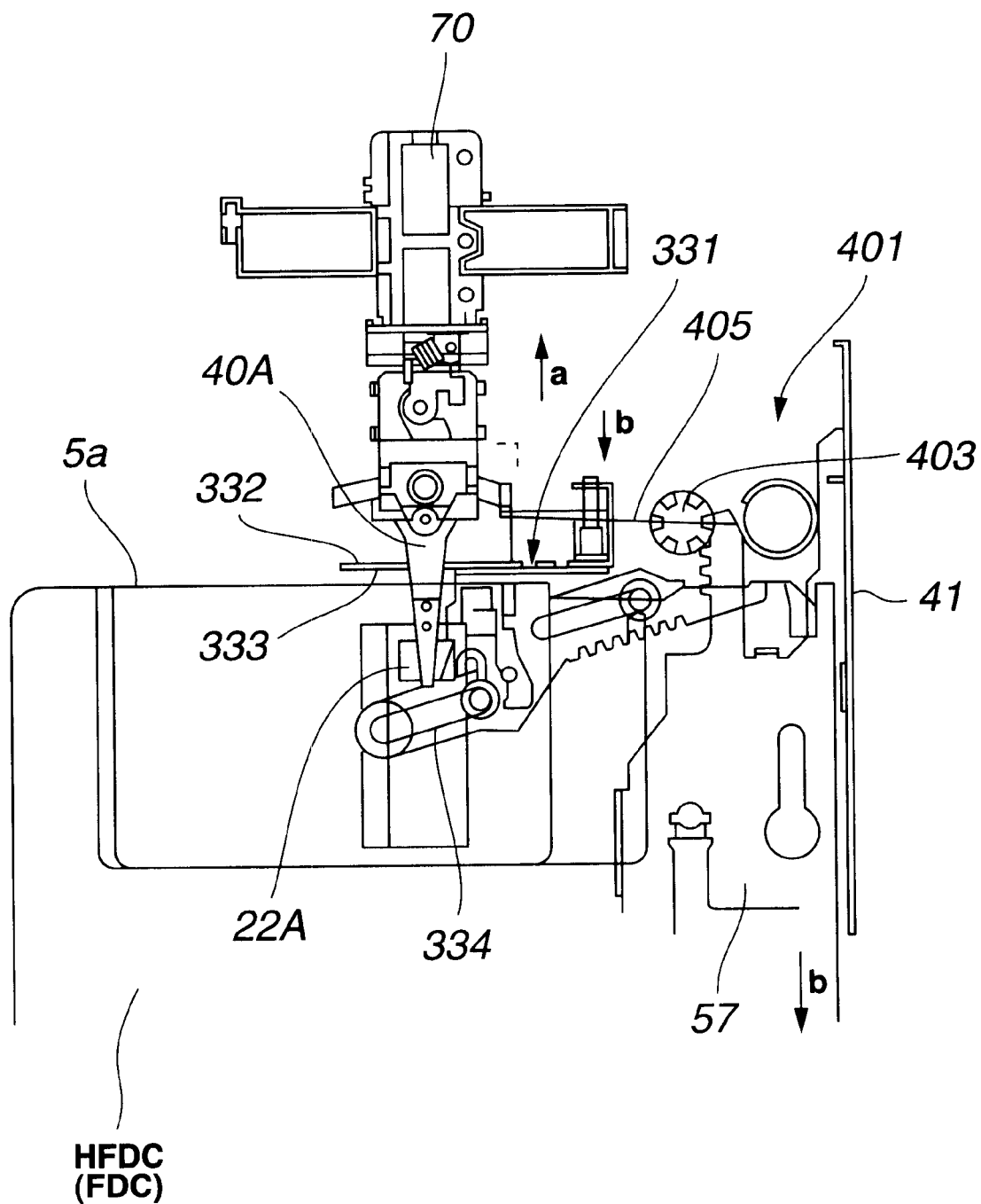
FIG. 7 is a top plan view specifically illustrating the operation of a magnetic head landing mechanism of the floppy disc drive of FIG. 1.

FIG. 7 shows the construction of the head lowering mechanism 331. As shown, the head lowering mechanism 331 is disposed on a chassis 41 at a position behind (in the direction of arrow a) a front end face 5a of a large-capacity floppy disc cartridge HFDC or small-capacity floppy disc cartridge FDC selectively loaded horizontally at a loading position on the chassis 41.

Figure 8:
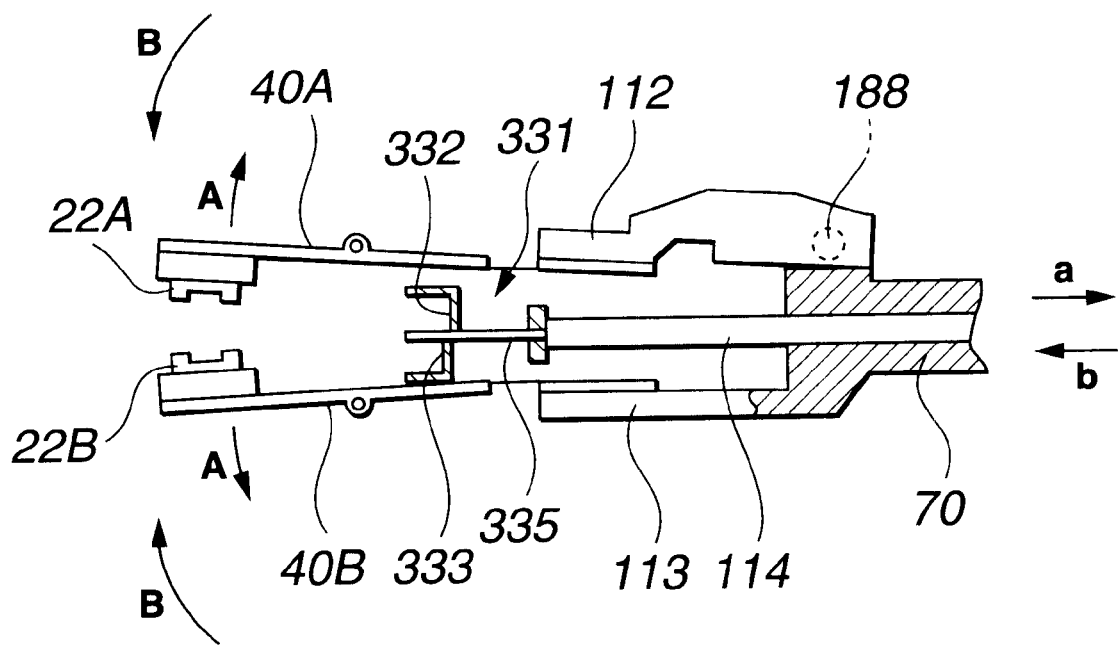
FIG. 8 is a partial side elevational view of the operation of the magnetic head landing mechanism specifically illustrating the magnetic head in a parked position.

The head landing mechanism 331 includes a sliding plate 57 of a cartridge loading mechanism for the cartridges HFDC and FDC (referred to as "first sliding plate" hereinafter), and a second sliding plate 334 on which a pair of upper and lower head lifting arms 332 and 333 are installed. The upper and lower head lifting arms 332 and 333 are vertically inserted between the support arms 40A and 40B perpendicularly to a scanning center in the longitudinal direction of the upper and lower support arms 40A and 40B. A stationary guide shaft 335 parallel to the scanning center is also installed horizontally between the upper and lower support arms 40A and 40B as shown in FIG. 8. Further, at one side of the guide shaft 335, a fulcrum shaft 336 is installed horizontally on the second sliding plate 334 in parallel to the guide shaft 335 as shown in FIG. 9.

Figure 9:
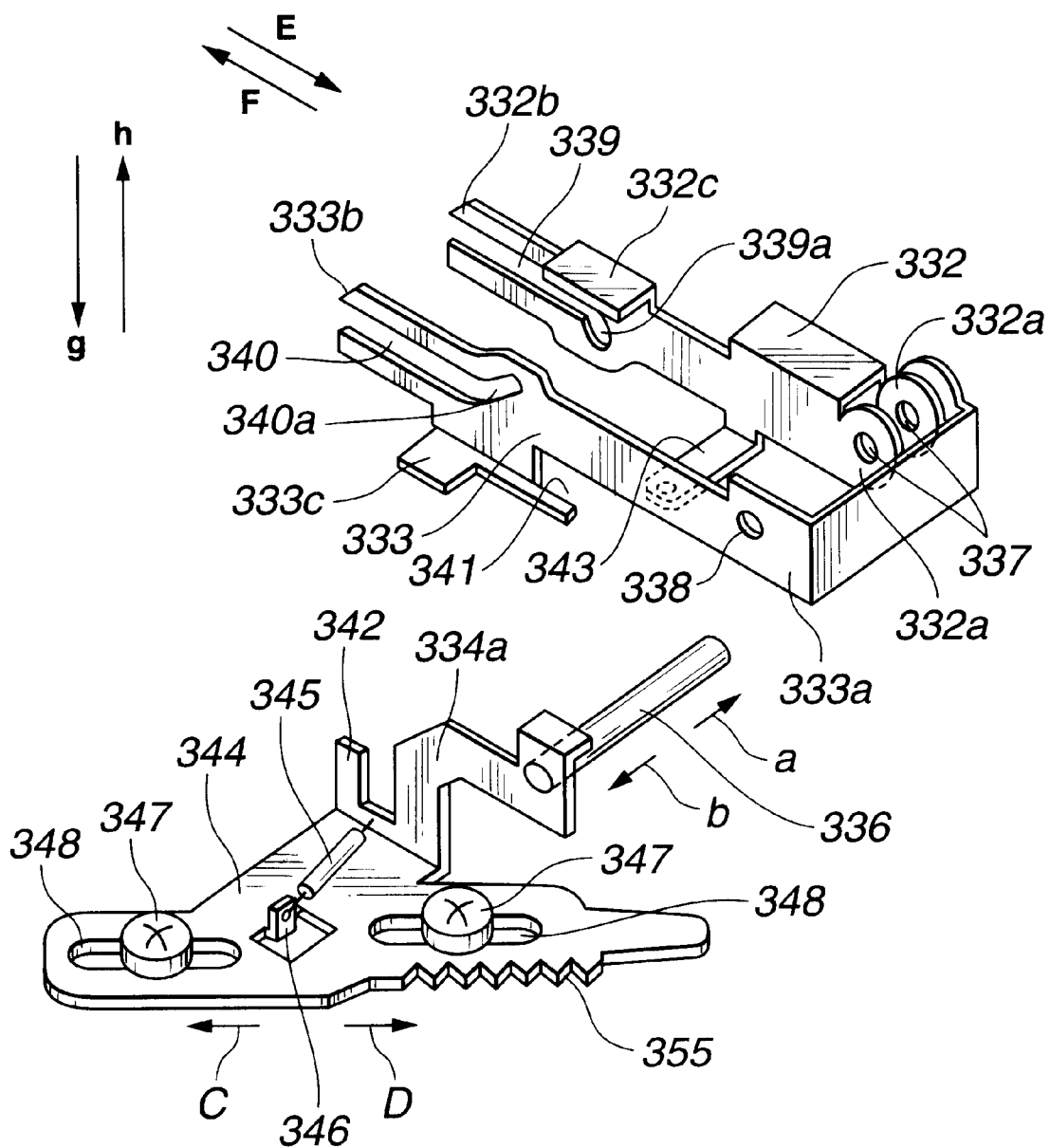
FIG. 9 is an exploded perspective view of the components of the magnetic head landing mechanism of FIGS. 7 and 8.

The main guide shaft 335 is formed concentrically and integrally with the end of a guide shaft 114 of the head carriage 70 as shown in FIG. 8, and the fulcrum shaft 336 is installed to a support portion 334a erected from the second sliding plate 334 as shown in FIG. 9. The upper and lower head lifting arms 332 and 333 have formed in one end portions 332a and 333a thereof shaft insertion holes 337 and 338, respectively, in which the fulcrum shaft 336 is inserted. Thus, the upper and lower head lifting arms 332 and 333 are rotatable about the fulcrum shaft 336 symmetrically in the directions of arrows A and B, respectively, which are upward and downward directions, respectively, as in FIG. 8. The upper and lower head lifting arms 332 and 333 have formed in the other end portions 332b and 333b thereof cam recesses 339 and 340, respectively, extending horizontally along the length of the other end portions 332b and 333b, respectively. The guide shaft 335 is slidably inserted in the upper and lower cam recesses 339 and 340 with the axis thereof being perpendicular to the latter. The cam recesses 339 and 340 are further extended by cam-activating recesses 339a and 340a, respectively, formed also in the pair of head lifting arms 332 and 333, respectively. The cam-activating recesses 339a and 340a and thus the pair of upper and lower head lifting arms 332 and 333 rotate in the direction of arrow A. They are bent symmetrically at the inner ends (nearer to the fulcrum shaft 336) of the cam-activating recesses 339a and 340a, respectively, in opposite directions, namely, one upward and the other downward.

The upper and lower head lifting arms 332 and 333 have formed integrally therewith at the middle of the length thereof support arm receiving plates 332c and 333c bent at a right angle from the upper and lower edges, respectively, thereof towards the upper and lower heads 22A and 22B. The head lifting arm 332 for moving the upper head 22A is slidable in the forward and backward directions of arrows a and b, respectively, along the guide shaft 335 and fulcrum shaft 336, while the other head lifting arm 333 for moving the lower head 22B is disposed at a position before the head lifting arm 332 (in the direction of arrow b) and prevented from sliding in the directions of arrows a and b. More particularly, the other head lifting arm 333 has formed in the lower edge thereof a slit 341 in which a vertical guide piece 342 formed at a part of the support portion 334a of the second sliding plate 334 is slidably engaged in the directions of arrows h and g to prevent the other head lifting arm 333 from sliding in the directions of arrows a and b. Also, the one head lifting arm 332 has formed at the lower end thereof a horizontally bent spring catch 343. The second sliding plate 334 has a spring catch 346 extending therefrom. As a means for forcing the head lifting arm to slide, a helical tension spring 345 is provided between the spring catches 343 and 346. As such, the head lifting arm 332 is forced by the helical tension spring 345 to slide in the direction of arrow b along the guide shaft 335 and fulcrum axis 336.

Figure 10A:
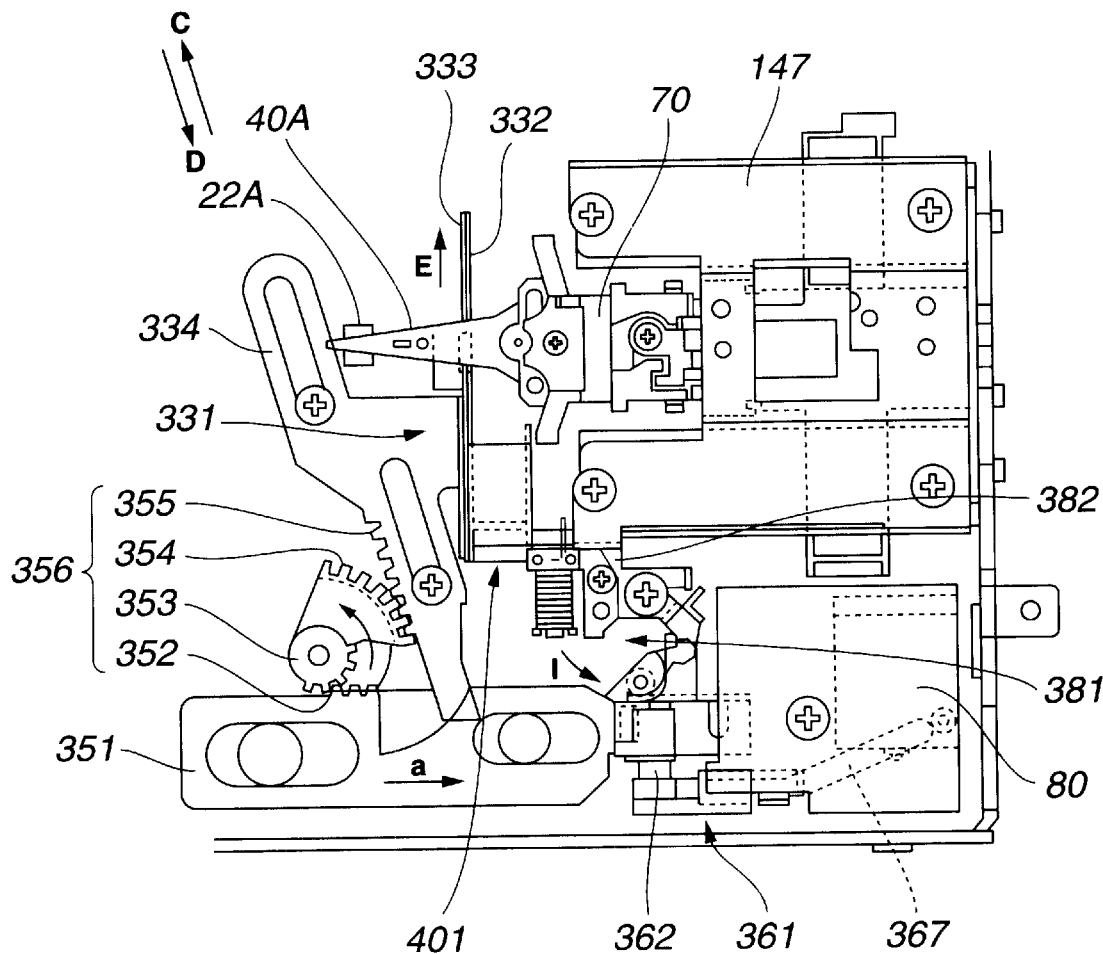
FIGS. 10A and 10B are respectively a top plan view and a side elevational view of the magnetic head landing mechanism of FIGS. 7 and 8 in the magnetic head unloading position.
Figure 10B:
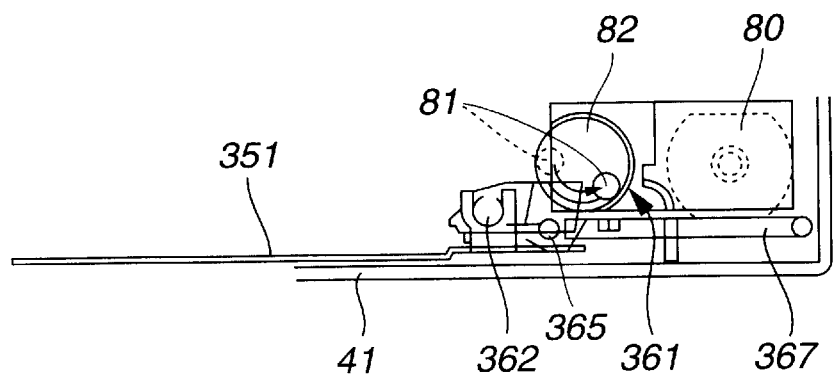
Figure 11A:
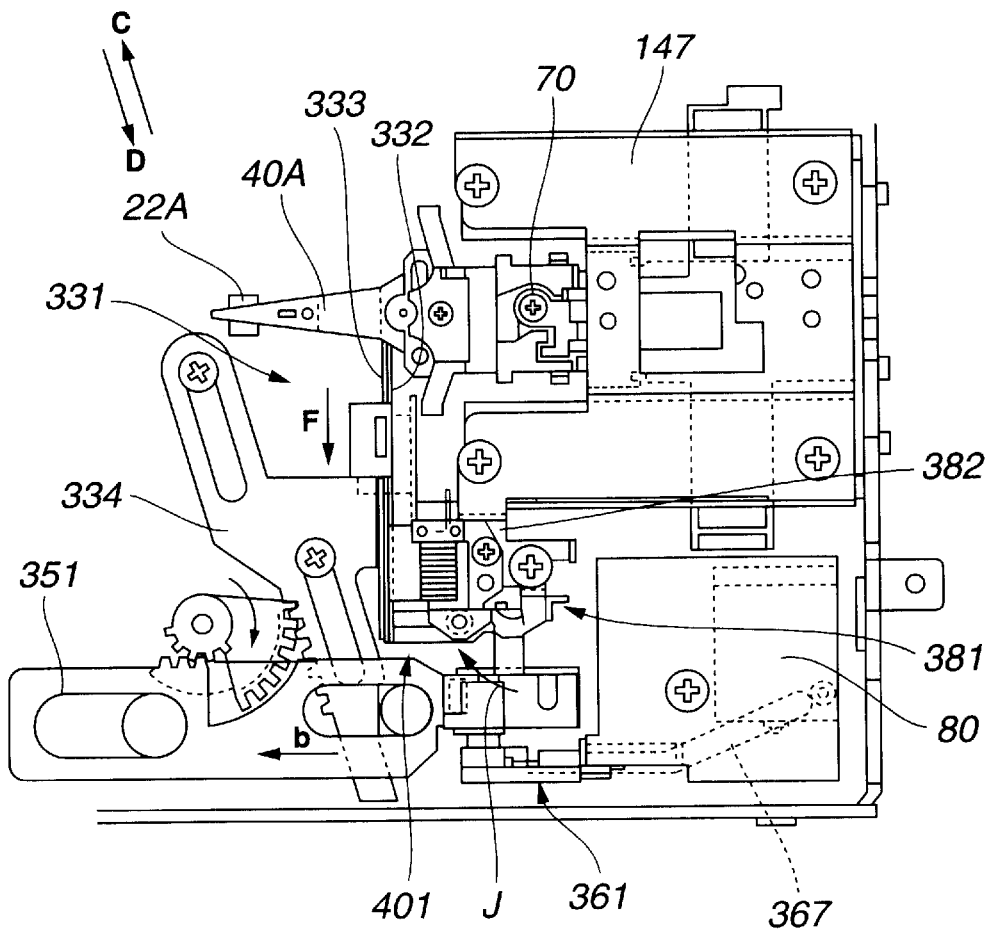
FIGS. 11A and 11B are respectively a top plan view and a side elevational view of the magnetic head landing mechanism of FIGS. 7 and 8 in the data writing and/or reading position.
Figure 11B:
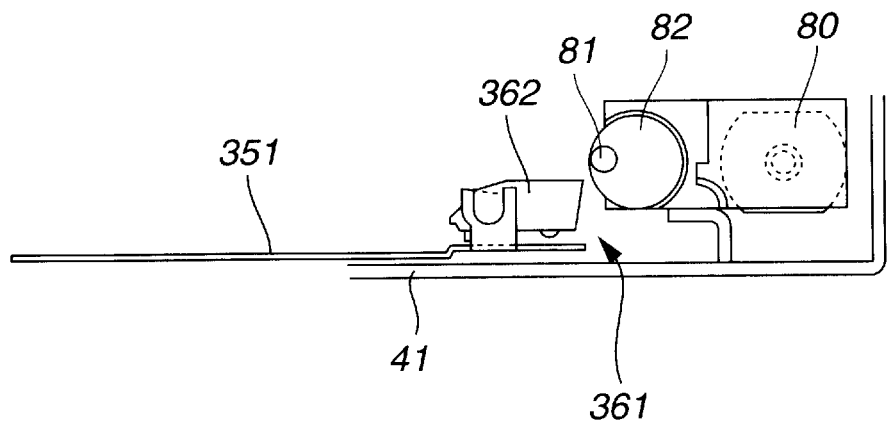

The second sliding plate 334 is guided on the chassis 41 by a guide pin 347 and a guide recess 348 to move in the directions of arrows C and D in FIGS. 10 and 11 along a sliding center inclined relative to the scanning center. Thus, as the second sliding plate 334 slides, the pair of upper and lower head lifting arms 332 and 333 are inserted in the direction of arrows E between the upper and lower support arms 40A and 40B and ejected therefrom in the direction of arrows F.

As shown in FIGS. 10 and 11, a third sliding plate 351 which is slidable in the directions of arrows a and b is disposed between the first and second sliding plates 57 and 334. The sliding directions a and b of the third sliding plate 351 are the same directions as that of the first sliding plate 57. The third sliding plate 351 and second sliding plate 334 are interlocked with each other by a direction changing means 356 composed of two sets of gears with one gear set including a rack 352 and pinion 353 and the other gear set including a pinion 354 and rack 355, so that the second sliding plate 334 is slid in the directions of arrows C and D synchronously with the sliding of the third sliding plate 351 in the directions of arrows a and b.

Figure 12A:
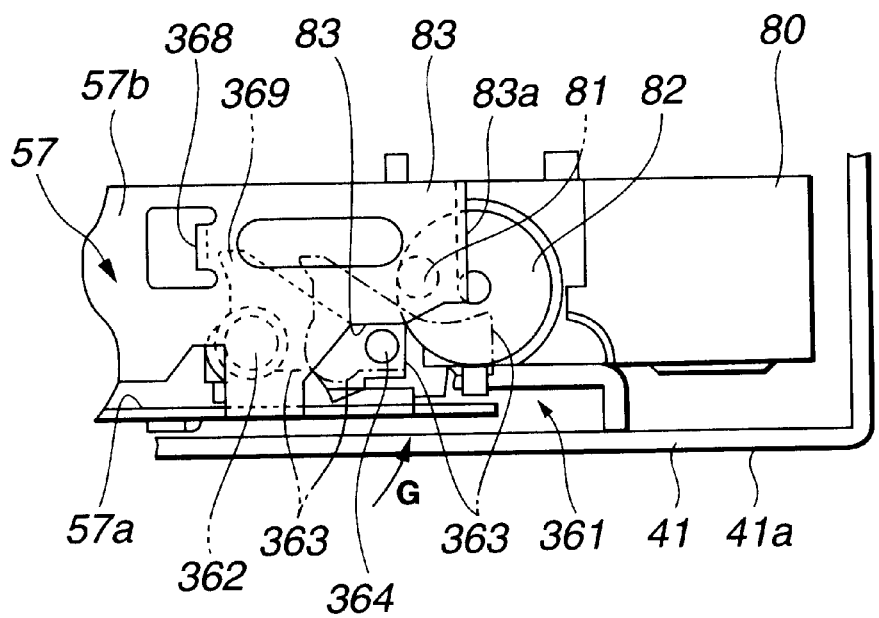
FIGS. 12A and 12B are side elevational views of the magnetic head landing mechanism of FIGS. 7 and 8 specifically illustrating the operation of the DC motor provided to drive the magnetic head landing mechanism.
Figure 12B:
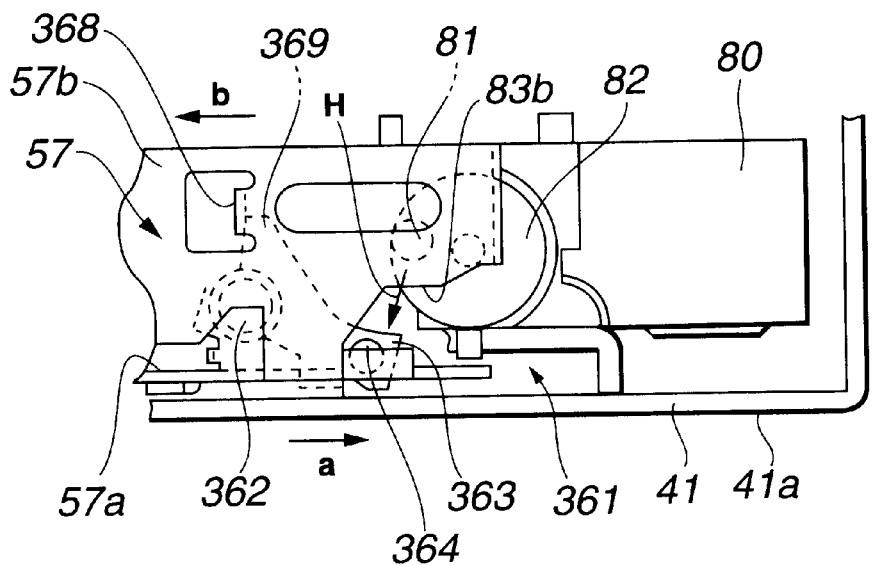
Figure 13A:
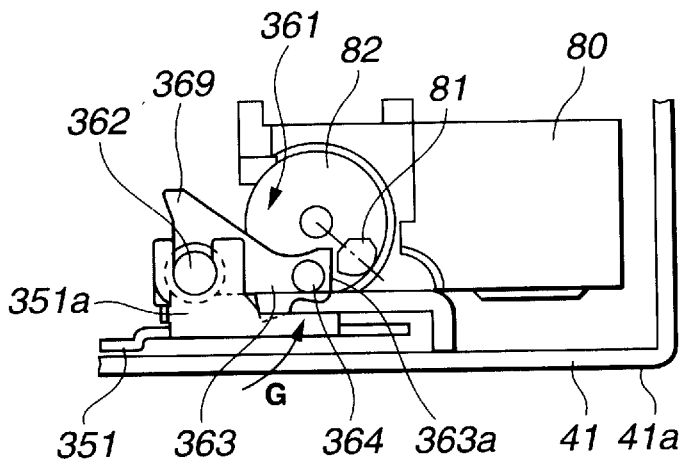
FIGS. 13A, 13B and 13C are side elevational views of the magnetic head landing mechanism of FIGS. 7 and 8 specifically illustrating the operation of the DC motor which drives the magnetic head landing mechanism of FIGS. 7 and 8.
Figure 13B:
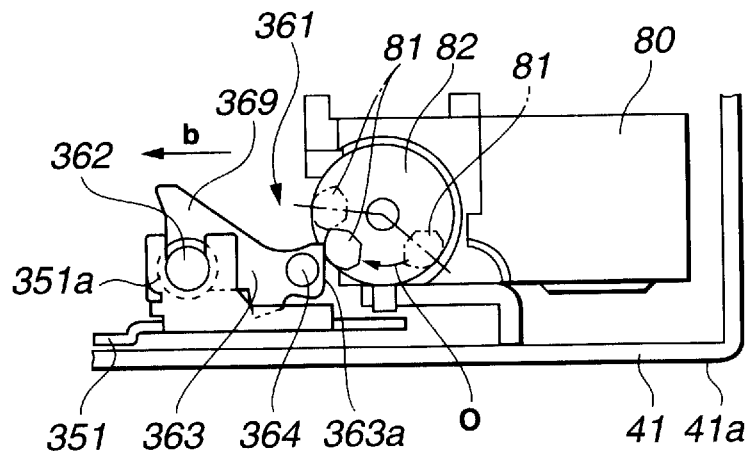
Figure 13C:
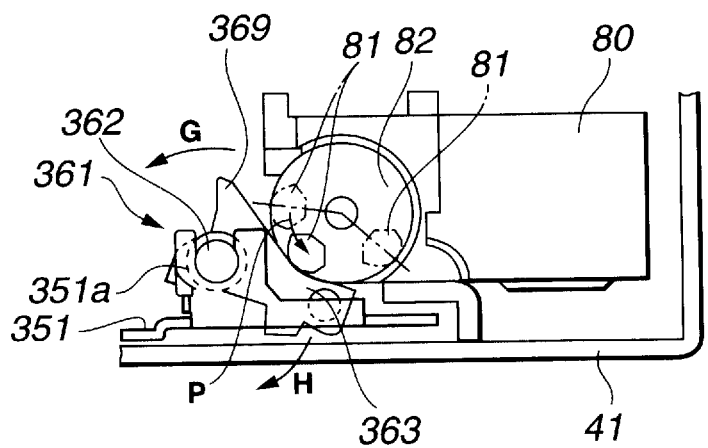

A driving mechanism 361 is further provided and is adapted to selectively drive the first and third sliding plates 57 and 351 by means of the DC motor 80 which is a geared motor. As shown in FIGS. 12 and 13, the driving mechanism 361 includes an eject pin 81 for an eject cam 82, an eject arm 83 for the first sliding plate 57, and a molded transmission arm 362 installed to the third sliding plate 351. As shown in FIG. 13, the third sliding plate 351 has formed at the rear end thereof (in the direction of arrow a) an arm support 351a in which the transmission arm 362 is assembled horizontally and perpendicularly to the directions of arrows a and b. Thus, the transmission arm 351a is rotatable in the directions of arrows G and H. The eject pin 81 selectively abuts, from the direction of arrow b, an arm 363 projected from the outer end of the transmission arm 362 to the rear end (in the direction of arrow a).

A pin 364 formed perpendicularly to and integrally with the outer surface of the arm 363 is also provided. The pin 364 can abut against the eject arm 83 for the first sliding plate 57.

The arm 363 has a spring catch 365 formed perpendicularly to and integrally with the outer surface thereof, and the chassis 41 has a spring catch formed thereon at a position sufficiently separate and rearward (in the direction of arrow a) from the spring catch 365. Between these spring catches, a long-stroke helical tension spring 367 is provided which forces the third sliding plate 351 to slide in the direction of arrow a by means of the transmission arm 362 while forcing the transmission arm 362 to rotate in the direction of arrow G, namely, upwardly. Thus, the helical tension spring 367 forces the entire head lowering mechanism 331 to slide in the direction of arrow E. In addition, a projection 368 is formed at a position located inside the eject arm 83 for the first sliding plate 57 and separate from the end 83a of the eject arm 83 in the direction of arrow b. The projection 368 is an interlocking means and can abut an abutment 369 of the transmission arm 362 from the direction of arrow a.

Figure 14:
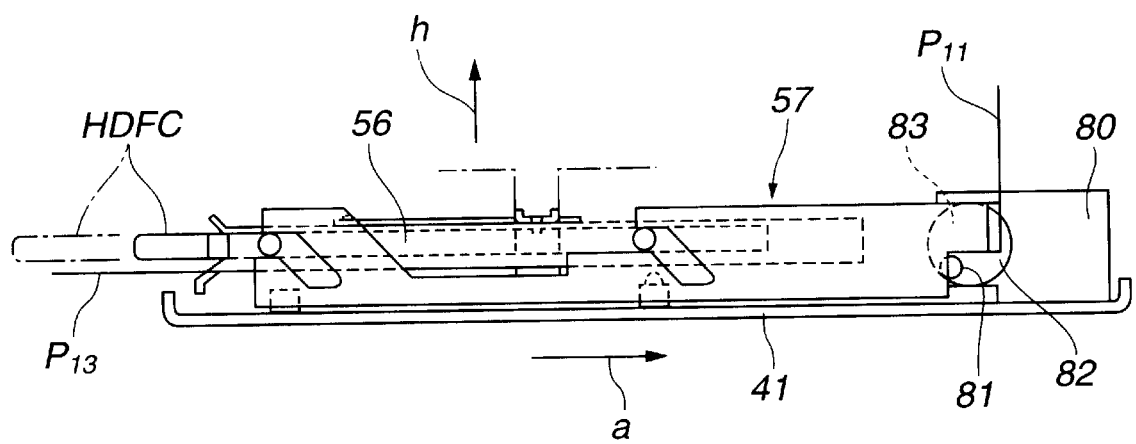
FIG. 14 is a side elevational view of the cartridge loading mechanism of the floppy disc drive of FIG. 1 in the unloading position.
Figure 15:
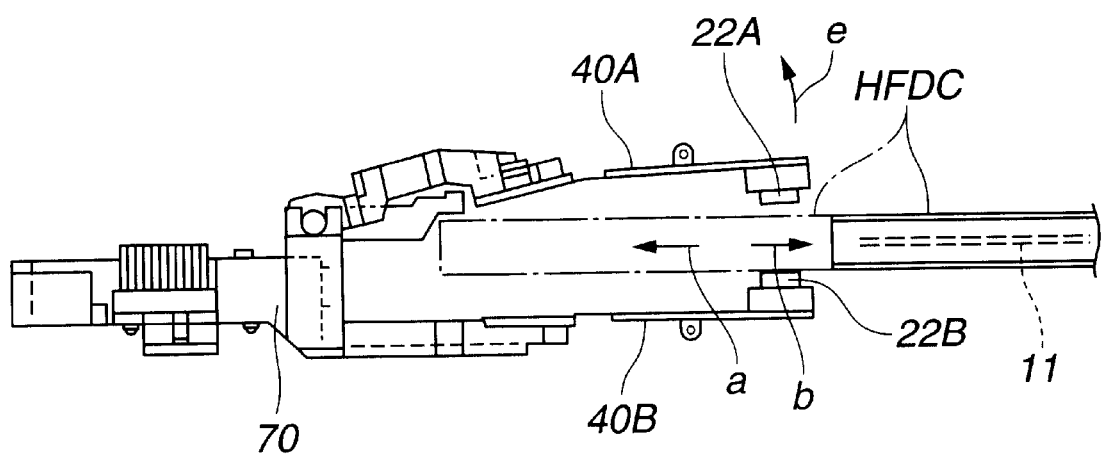
FIG. 15 is a side elevational view of the magnetic head specifically illustrating the loading and unloading of a cartridge into and from the magnetic head.

The head landing mechanism 331 constructed as described in the foregoing functions when the large-capacity floppy disc cartridge HFDC is inserted in position, as will be described below. First, with no cartridge loaded as shown in FIG. 14, a cartridge holder 56 having returned to the unloading position lifts the upper head arm 112 of the head carriage 70 in FIG. 8 to an upper parked position shown in FIG. 15 in the direction of arrow e. The upper head 22A and support arm 40A are forced upwardly to the upper parked position in FIG. 8 against their resilience in the direction of arrow A. With no cartridge loaded, the third sliding plate 351 is forced by the helical tension spring 367 to slide in the direction of arrow a as shown in FIG. 10, the second sliding plate 334 is forced by the direction changing means 356 to slide in the direction of arrow E, and thus the pair of upper and lower head lifting arms 332 and 333 of the head landing mechanism 331 are inserted to the deepest position between the upper and lower support arms 40A and 40B in the direction of arrow C, as shown in FIG. 16D. The guide shaft 335 is inserted in the pair of cam recesses 339 and 340 in the pair of head lifting arms 332 and 333 in the direction of arrow E. Thus, the guide shaft 335 is engaged at the upper and lower portions thereof in the pair of cam-activating recesses 339a and 340a, respectively, formed at the deepest positions of the cam recesses 339 and 340, respectively, so that the upper and lower lifting arms 332 and 333 are rotated about the fulcrum shaft 336 symmetrically upwardly and downwardly in the direction of arrow A (outward).

Figure 17A:
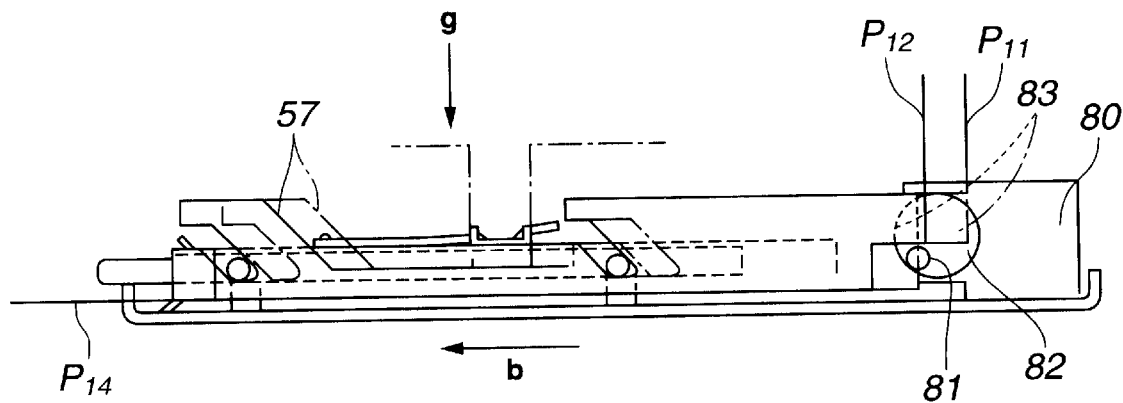
FIGS. 17A, 17B and 17C are side elevational views of the cartridge loading mechanism of the floppy disc drive of FIG. 1 in the loading position.
Figure 17B:
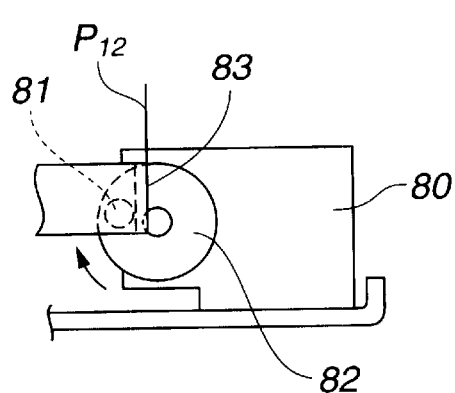
Figure 17C:
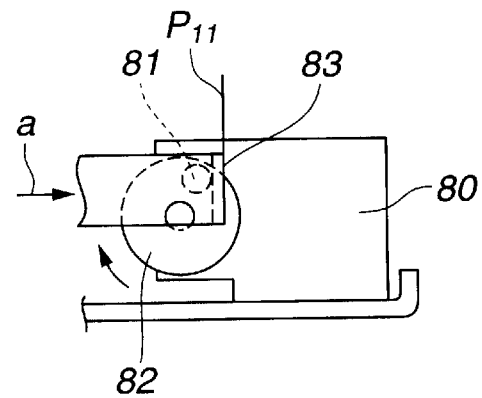
Figure 18:
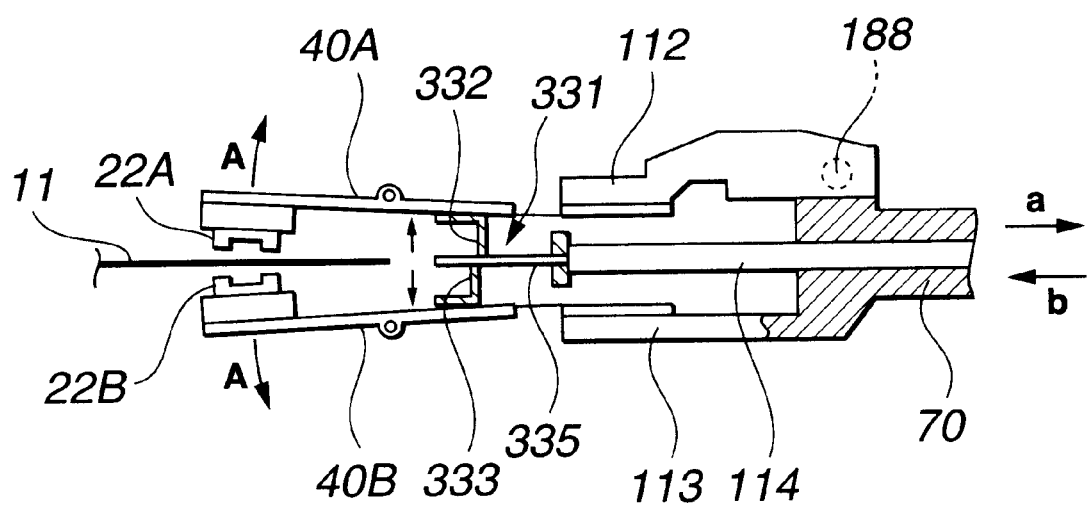
FIG. 18 is a partially fragmentary side elevational view of the magnetic head landing mechanism of the floppy disc drive of FIG. 1 in the magnetic head unloading position.

As having previously been described, the large-capacity floppy disc cartridge HFDC is inserted into the cartridge holder 56 in FIG. 14 from the direction of arrow a, the first sliding plate 57 is slid in the direction of arrow b from an unloading position P11 to a loading position P12 shown in FIG. 17, and the cartridge holder 56 lands the large-capacity floppy disc cartridge HFDC in the direction of arrow g from an unloading position P13 down to a loading position P14 as shown in FIG. 17. Here the floppy disc cartridge HFDC is loaded in position. With the cartridge in this position, the support arms 40A and 40B contact the support arm receiving plate 332c of the upper head lifting arm 332 as shown in FIG. 18. In this condition, the upper and lower heads 22A and 22B are held in their respective head-unloaded positions vertically apart from the upper and lower surfaces, respectively, of the floppy disc 11. Therefore, there is no likelihood that the cartridge loading operation will cause the upper and lower heads 22A and 22B to violently shock the upper and lower surfaces of the floppy disc 11.

Figure 16A:
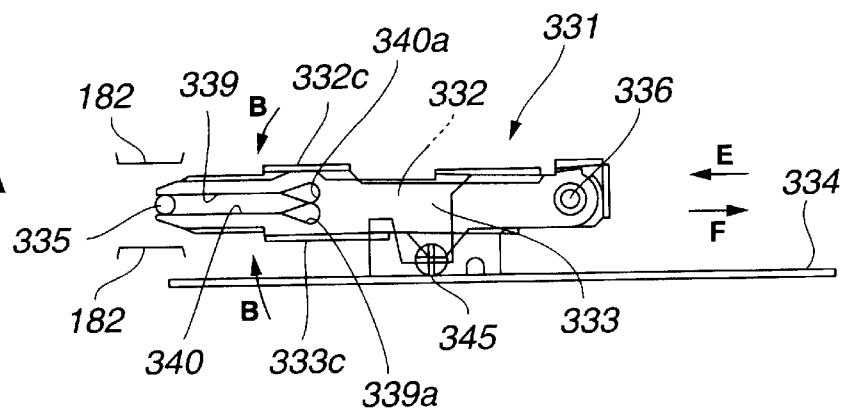
FIGS. 16A, 16B, 16C and 16D are side elevational views specifically illustrating the sequence of operations of the magnetic head landing mechanism.
Figure 16B:
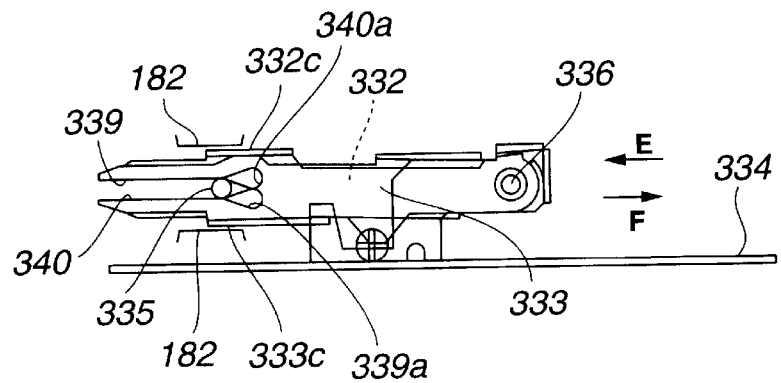
Figure 16C:
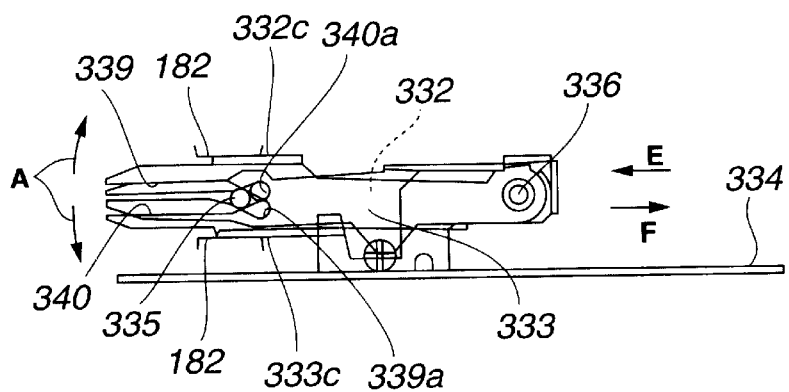
Figure 16D:
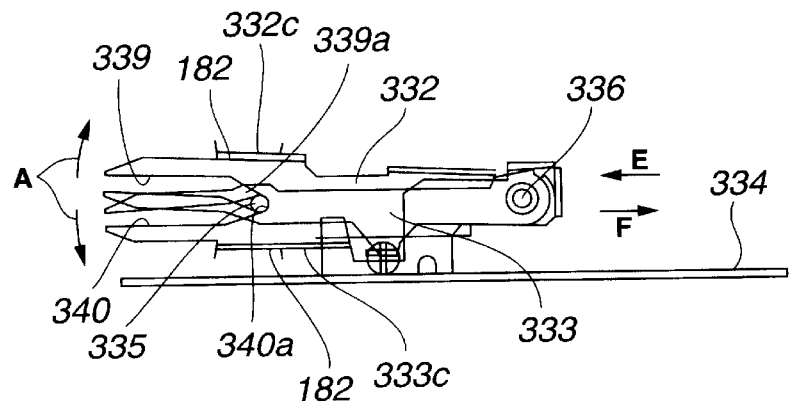

Thereafter, when a command signal for data write or read is supplied from the host computer, the DC motor 80 will drive the third sliding plate 351 to slide in the direction of arrow b as shown in FIG. 11, the direction changing means 356 will cause the second sliding plate 334 to slide at a safe speed in the direction of arrow F, and thus the pair of upper and lower head lifting arms 332 and 333 are ejected from between the support arms 40A and 40B at a safe speed in the direction of arrow F as shown in FIGS. 16A, 16B and 16C. Then, the guide shaft 335 will be withdrawn from the pair of cam recesses 339 and 340 in the pair of upper and lower head lifting arms 332 and 333 in the direction of arrow F. Due to the cam action of the cam-activating recesses 339a and 340a on the guide shaft 335, the pair of upper and lower head lifting arms 332 and 333 are rotated about the fulcrum shaft 336 symmetrically upwardly and downwardly in the direction of arrow B (inward), namely, they will be closed towards each other.

Then, synchronously with the pair of upper and lower head lifting arms 332 and 333, the support arms 40A and 40B are closed inwardly at a safe speed under the resilience thereof and thus the heads 22A and 22B will approach the upper and lower surfaces, respectively, of the floppy disc 11 at a safe speed symmetrically upwardly and downwardly, respectively, from the direction of arrow B. As shown in FIG. 16A, when the pair of upper and lower support arm receiving plates 332c and 333c of the pair of upper and lower head lifting arms 332 and 333, respectively, have been completely ejected from the pair of upper and lower support arms 40A and 40B in the direction of arrow F, the upper and lower heads 22A and 22B are loaded at a safe speed from the direction of arrow B to a head-loaded position where they will be in contact with the upper and lower surfaces, respectively, of the floppy disc 11. This is the head-loading operation.

In the floppy disc drive 10 according to the present invention, when the large-capacity floppy disc cartridge HFDC is inserted in the disc slot of the disc drive 10, the CPU 101 shown in FIG. 1 controls the speed of the DC motor 80 in the PWM manner to slow down so that the magnetic head 21 lands on the floppy disc 11 without breaking the air film developed by the rotation of the floppy disc 11. Also, the CPU 101 controls the VCM 108 to move the magnetic head 21 radially of the floppy disc 11.

Figure 19A:
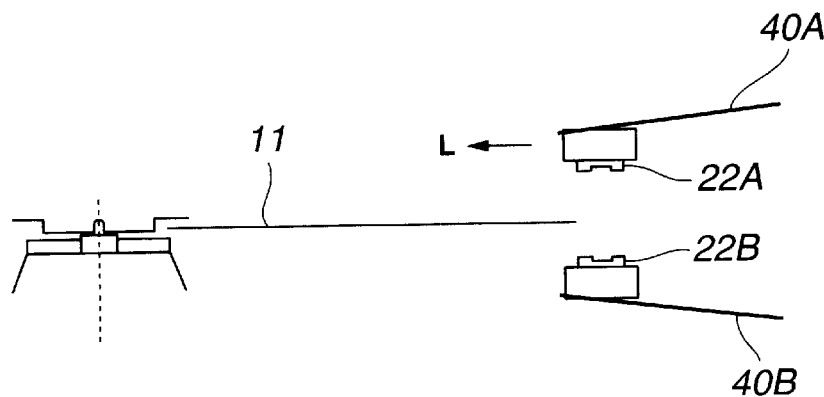
FIGS. 19A, 19B, 19C and 19D are schematic representations of the magnetic head landing operation of the floppy disc drive of FIG. 1 according to the present invention.
Figure 19B:
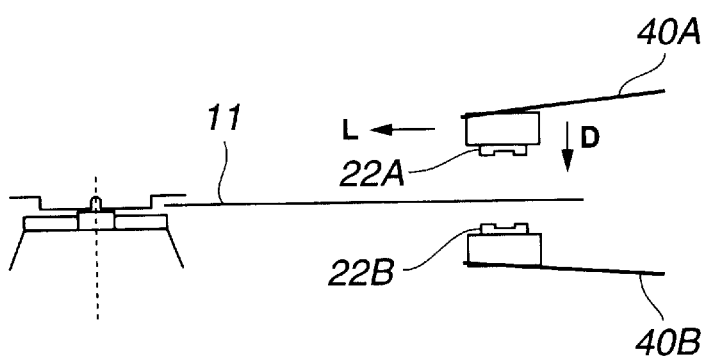
Figure 19C:
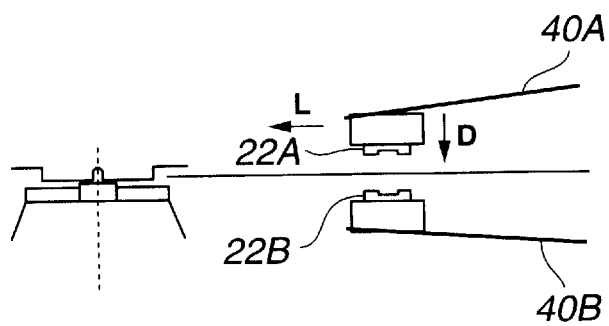
Figure 19D:
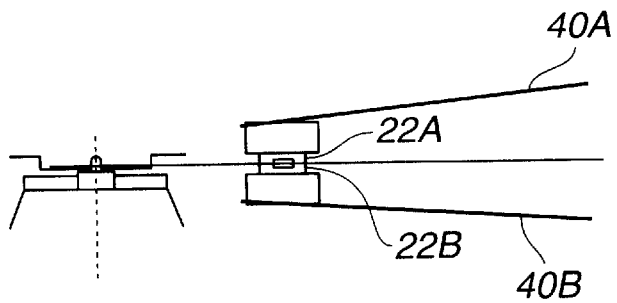

Therefore, in the floppy disc drive 10 provided with the aforementioned magnetic head 21, when the upper and lower heads 22A and 22B are landed onto the large-capacity floppy disc 11B by means of the support arms 40A and 40B, respectively, they are landed at a speed reduced by the CPU 101 in the PWM manner in the direction of arrow B not to break the air film while the heads 22A and 22B are moved radially (L) of the large-capacity floppy disc 11A, as shown in FIGS. 19A and 19B. Thus, it is possible to suppress the impact of the heads 22A and 22B on the surface of the floppy disc 11A, which will thus be prevented from being damaged. That is to say, this head loading operation is a so-called soft landing.

Also, since each time the floppy disc drive 10 is used, the heads 22A and 22B are landed on the floppy disc 11 at different positions from positions where they have landed before, the frequency of the contact of the heads 22A and 22B with the same position on the floppy disc 11 can be likewise reduced.

Figure 20A:
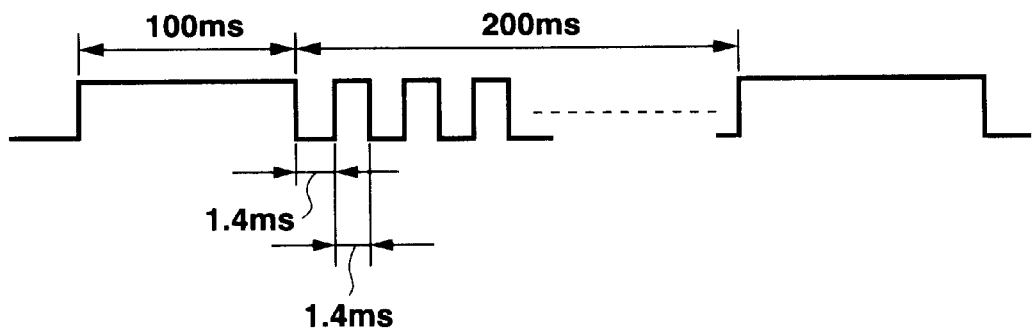
FIGS. 20A and 20B are charts representing the control of the DC motor by the CPU in the floppy disc drive of FIG. 1.
Figure 20B:
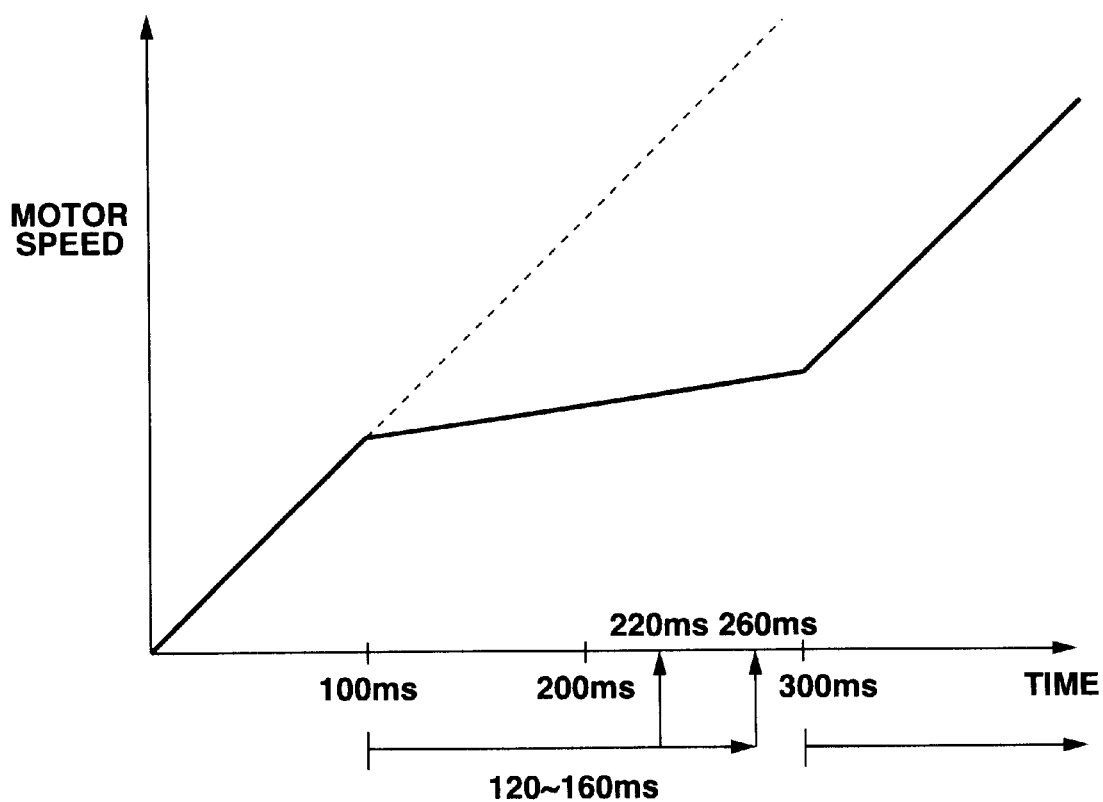

The PWM control of the DC motor 80 by the CPU 101 will be described in detail below with reference to FIG. 20. As shown in FIG. 20A, for an initial period of 100 ms, the DC motor 80 is driven linearly to close the pair of upper and lower head lifting arms 332 and 333 of the head landing mechanism 331, and then for a period of 200 ms, the DC motor 80 is driven at a low speed with the pulse turned on and off at every 1.4 ms to close the pair of upper and lower head lifting arms 332 and 333. In about 220 to 260 ms, the upper and lower heads 22A and 22B will land on the floppy disc 11A. In 300 ms, the DC motor 80 is driven linearly to withdraw the head landing mechanism 331 from between the support arms 40A and 40B.

After completion of such a soft landing control, a command signal is supplied from the host computer to the floppy disc drive 10 for write or read of data to or from the floppy disc 11 as will be described later. For ejection of the floppy disc cartridge after the data write or read, the first sliding plate 57 is slid back in the direction of arrow a from the loading position of FIG. 17 to the unloading position of FIG. 14. At this time, the projection 368 formed inside the eject arm 83 for the first sliding plate 57 abuts the abutment 369 of the transmission arm 362 from the direction of arrow a as shown in FIGS. 12A and 12B to press the abutment 369, namely, the transmission arm 362, in the same direction. Then, the third sliding plate 351 is slid along with the transmission arm 356 in the direction of arrow a and the second sliding plate 334 is slid by the direction changing means 356 in the direction of arrow E, as shown in FIG. 10. As shown in FIGS. 16A, 16B, 16C and 16D and FIG. 18, the pair of upper and lower head lifting arms 332 and 333 of the head landing mechanism 331 is introduced again between the support arms 40A and 40B from the direction of arrow E. The support arms 40A and 40B will be opened again in the direction of arrow A against their resilience, and the upper and lower heads 22A and 22B will thus be unloaded to the head-unloaded position.

In the embodiment having been described in the foregoing, the magnetic head is moved by the VCM 108 radially of the floppy disc while being landed by the head landing mechanism at a speed controlled by the CPU 101 in the PWM manner. However, the magnetic head may simply be landed slowly while being moved by the VCM 108 only radially of the floppy disc.

In the recording and/or reproducing apparatus according to the present invention, a controlling means is adopted to provide such a control under which the magnetic head is landed by the head landing mechanism while the magnetic head is moved by the head moving means radially of the disc-like recording medium loaded in position in the apparatus. As a result, the magnetic head will not always be landed to the same position on the magnetic disc. That is, the magnetic head can be landed in a different zone each time the apparatus is used.

The head driving mechanism of the head landing mechanism is controlled to change the landing speed for slow landing of the disc-like recording medium, which can attain a soft landing of the magnetic head.

Although the invention has been particularly shown and described with reference to certain preferred embodiments, it will be readily appreciated by those of ordinary skill in the art that various charges and modifications may be made therein without departing from the spirit and scope of the invention. It is intended that the appended claims be interpreted as including the foregoing as well as various other such changes and modifications.

What is claimed is:

1. A disc drive apparatus for recording data on and/or reproducing data from a disc-shaped recording medium, comprising:

a head to write data on and/or read data from the disc-shaped recording medium;

a head supporting member for supporting the head;

moving means for moving the head supporting member to move the head in the radial direction of the disc-shaped recording medium;

head landing means for landing the head onto the disc-shaped recording medium via the head supporting member; and a detector for detecting a type of the recording medium; and controlling means for controlling the head landing means and the head moving means so that the head landing means lands the head onto the disc-shaped recording medium in a first way when a first type recording medium is detected and a second way when a second type recording medium is detected.

2. The disc drive apparatus according to claim 1, wherein the head landing means comprises a head landing mechanism and a head landing driving means, wherein the head landing means lands the head slowly onto the disc-shaped recording medium at a speed changeable under the control of the controlling means.

3. The disc drive apparatus according to claim 2, wherein the controlling means changes the landing speed to a relatively slow landing speed immediately before the head comes into contract with the disc-shaped recording medium.

4. The disc drive apparatus according to claim 2, wherein the head landing driving means is controlled in a PWM manner by the controlling means.

5. The disc drive apparatus according to claim 1, wherein the controlling means controls the head moving means for moving the head toward the interior of the disc-shaped recording medium.

6. The disc drive apparatus according to claim 1, wherein the head writes an air flow created as a result of the rotation of the disc-shaped recording medium.

7. The disc drive apparatus according to claim 1 and further comprising:
  a second head to write data on and/or read data from the disc-shaped recording medium, and a second head supporting member for supporting the second head;
  wherein said second head supporting member is arranged at an opposite side of the disc-shaped recording medium to the head and is moved in the radial direction of the disc-shaped recording medium by the moving means.

8. The disc drive apparatus according to claim 7, wherein the head landing means lands the second head onto the disc-shaped recording medium.

9. The disc drive apparatus according to claim 1, wherein the moving means comprises a voice coil motor.

10. A disc drive apparatus for recording data on and/or reproducing data from both sides of a disc-shaped recording medium;
  a first head supporting member for supporting the first head at the one side of the disc-shaped recording medium;
  a second head supporting member supporting the second head at the other side of the disc-shaped recording medium;
  moving means for moving the first and second head supporting members to move the first and second heads in the radial direction of the disc-shaped recording medium; head landing means for landing the first and second heads onto the disc-shaped recording medium via the first and second head supporting members; and
  controlling means for controlling the head landing means and the head moving means so that the head landing means lands the first and second heads onto the disc-shaped recording medium while the first and second head are moved by the head moving means in the radial direction of the disc-shaped recording medium.

11. The disc drive apparatus according to claim 10, wherein the head landing mean comprises a head landing mechanism and a head landing driving means, wherein the head landing means lands the first and second heads slowly onto the disc-shaped recording medium at a speed changeable under the control of the controlling means.

12. The disc drive apparatus according to claim 11, wherein the controlling means changes the landing speed to a relatively slow landing speed immediately before the head comes into contact with the disc-shaped recording medium.

13. The disc drive apparatus according to claim 11, wherein the head landing driving means is controlled in a PWM manner by the controlling means.

14. The disc drive apparatus according to claim 10, wherein the controlling means controls the head moving means for moving the first and second heads toward the interior of the disc-shaped recording medium.

15. The disc drive apparatus according to claim 10, wherein the head writes data on and/or reads data from the disc-shaped recording medium while the head is levitated by an air flow created as a result of the rotation of the disc-shaped recording medium.

16. The disc drive apparatus according to claim 10, wherein the moving mean comprises a voice coil motor.

17. A disc drive apparatus for recording data on and/or reproducing data from a disc-shaped recording medium, comprising:
  a head to write data on and/or read data from the disc-shaped recording medium;
  a head supporting member for supporting the head;
  moving means for moving the head supporting member to move the head in the radial direction of the disc-shaped recording medium;
  head landing means for landing the head onto the disc-shaped recording medium via the head supporting member;
  a detector for detecting a type of the disc-shaped recording medium; and
  controlling means for controlling the head landing means and the head moving means based on information received form said detector, wherein the head landing means lands the head onto the disc-shaped recording medium when the disc-shaped recording medium is a first type recording medium, and the head landing means lands the head onto the disc-shaped recording medium while moving the head by means of the head moving means in the radial direction of the disc-shaped recording medium when the disc-shaped recording medium is a second type recording medium.

18. The disc drive apparatus according to claim 17, wherein the head landing means comprises a head landing mechanism and a head landing driving means, wherein the head landing means lands the head slowly onto the disc-shaped recording medium at a speed changeable under the control of the controlling means.

19. The disc drive apparatus according to claim 18, wherein the controlling means changes the landing speed to a relatively slow landing speed immediately before the head comes into contract with the disc-shaped recording medium.

20. The disc drive apparatus according to claim 18, wherein the head landing driving means is controlled in a PWM manner by the controlling means.

21. The disc drive apparatus according to claim 17, wherein the controlling means controls the head moving means for moving the head to the interior of the disc-shaped recording medium when the disc-shaped recording medium is the second type recording medium.

22. The disc drive apparatus according to claim 17, wherein the head writes data on and/or reads data form the disc-shaped recording medium while the head is levitated by an air flow created as a result of the rotation of the disc-shaped recording medium when the disc-shaped recording medium is he second type recording medium.

23. The disc drive apparatus according to claim 17, wherein said second type recording medium has a larger capacity than said first type recording medium.

24. A method for landing a head onto a disc-shaped recording medium which head records data on and/or reproduces data form the disc-shaped recording medium, said method comprises the steps of:
  landing the head to the disc-shaped recording medium; and
  detecting the type of recording medium; and
  moving the head in the radial direction of the disc-shaped recording medium while the head is landed onto the disc-shaped recording medium when a first type recording medium is detected.

25. The method according to claim 24, wherein said head is landed onto the disc-shaped recording medium at a changeable landing speed.

26. The method according to claim 25, wherein said head is landed at a relatively slow landing speed immediately before the head comes into contact with the disc-shaped recording medium.

27. The method according to claim 24, wherein said head is moved toward the interior of disc-shaped recording medium while the head is landed on the disc-shaped recording medium.

* * * * *